US010397824B2

(12) United States Patent
Lee et al.

(10) Patent No.: US 10,397,824 B2
(45) Date of Patent: Aug. 27, 2019

(54) METHOD FOR CANCELLING A BUFFER STATUS REPORT OR A SCHEDULING REQUEST IN DUAL CONNECTIVITY AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/741,986

(22) PCT Filed: Jun. 22, 2016

(86) PCT No.: PCT/KR2016/006605
§ 371 (c)(1),
(2) Date: Jan. 4, 2018

(87) PCT Pub. No.: WO2017/007148
PCT Pub. Date: Jan. 12, 2017

(65) Prior Publication Data
US 2018/0199230 A1 Jul. 12, 2018

Related U.S. Application Data

(60) Provisional application No. 62/189,163, filed on Jul. 6, 2015.

(51) Int. Cl.
*H04W 28/02* (2009.01)
*H04W 76/10* (2018.01)
(Continued)

(52) U.S. Cl.
CPC ... *H04W 28/0278* (2013.01); *H04W 28/0247* (2013.01); *H04W 72/1284* (2013.01);
(Continued)

(58) Field of Classification Search
CPC ......... H04W 28/0278; H04W 28/0247; H04W 72/1284; H04W 72/14; H04W 76/10; H04W 24/10; H04W 28/10; H04W 88/06
See application file for complete search history.

(56) References Cited

U.S. PATENT DOCUMENTS 9,125,218 B2 * 9/2015 Chang ............... H04W 74/0833
9,722,743 B2 * 8/2017 Li ......................... H04W 28/08
(Continued)

FOREIGN PATENT DOCUMENTS

EP 2487981 8/2012
JP 2012526450 10/2012
(Continued)

OTHER PUBLICATIONS

PCT International Application No. PCT/KR2016/006605, Notification of Transmittal of The International Search Report and The Written Opinion of the International Searching Authority, or Declaration dated Sep. 30, 2016, 13 pages.
(Continued)

*Primary Examiner* — Wutchung Chu
(74) *Attorney, Agent, or Firm* — Lee, Hong, Degerman, Kang & Waimey

(57) ABSTRACT

The present invention relates to a wireless communication system. More specifically, the present invention relates to a method and a device for cancelling BSR or SR in dual connectivity, the method comprising: receiving an UL data from an upper layer, triggering a BSR (or SR) for a first eNB due to the UL data, transmitting, to a second eNB, at least a part of the UL data using an UL grant received from the second eNB, and cancelling the triggered BSR (or pending SR) when an amount of data available for transmission to be transmitted to the first eNB changes to zero due to the transmission of the at least a part of the UL data, even if an
(Continued)

UL grant in response to the triggered BSR (or pending SR) is not received from the first eNB.

12 Claims, 12 Drawing Sheets

(51) Int. Cl.
  *H04W 72/12*  (2009.01)
  *H04W 72/14*  (2009.01)
  *H04W 24/10*  (2009.01)
  *H04W 28/10*  (2009.01)
  *H04W 88/06*  (2009.01)

(52) U.S. Cl.
  CPC ........... *H04W 72/14* (2013.01); *H04W 76/10* (2018.02); *H04W 24/10* (2013.01); *H04W 28/10* (2013.01); *H04W 88/06* (2013.01)

(56) References Cited

U.S. PATENT DOCUMENTS

| | | | |
|---|---|---|---|
| 2010/0284354 A1 | 11/2010 | Ostergaard et al. | |
| 2012/0176967 A1* | 7/2012 | Kim | H04W 76/36 370/328 |
| 2014/0064219 A1* | 3/2014 | Quan | H04W 72/1284 370/329 |
| 2015/0016350 A1* | 1/2015 | Moulsley | H04W 72/0453 370/329 |
| 2015/0117287 A1* | 4/2015 | Kim | H04W 52/0216 370/311 |
| 2015/0271726 A1* | 9/2015 | Kim | H04W 36/0055 370/329 |
| 2016/0366675 A1* | 12/2016 | Dinan | H04L 5/001 |
| 2017/0013565 A1* | 1/2017 | Pelletier | H04W 52/146 |
| 2018/0020484 A1* | 1/2018 | Suzuki | H04W 72/04 |
| 2018/0092118 A1* | 3/2018 | Kim | H04W 28/0278 |

FOREIGN PATENT DOCUMENTS

| | | |
|---|---|---|
| WO | 2014003327 | 1/2014 |
| WO | 2014074656 | 5/2014 |
| WO | 2015012545 | 1/2015 |
| WO | 2015016574 | 2/2015 |
| WO | 2015020344 | 2/2015 |

OTHER PUBLICATIONS

European Patent Office Application Serial No. 16821554.9, Search Report dated Jan. 18, 2019, 10 pages.
Mediatek, "Scheduling Request for Small Packet", 3GPP TSG RAN WG2 Meeting #85bis, R2-141122, Apr. 2014, 3 pages.
Huawei, et al., "BSR generation procedure for UL bearer split", 3GPP TSG RAN WG2 Meeting #85bis, R2-141153, Apr. 2014, 5 pages.

* cited by examiner

[Fig. 1]
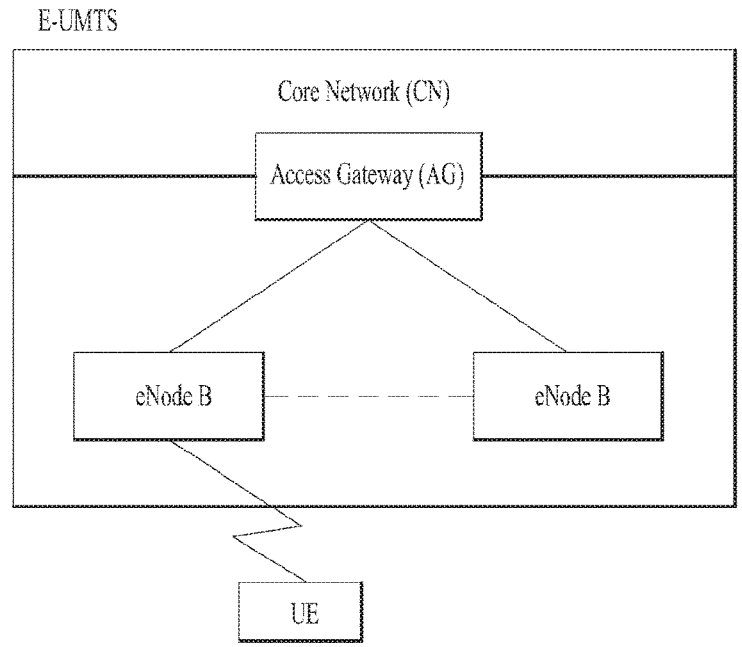
[Fig. 2A]
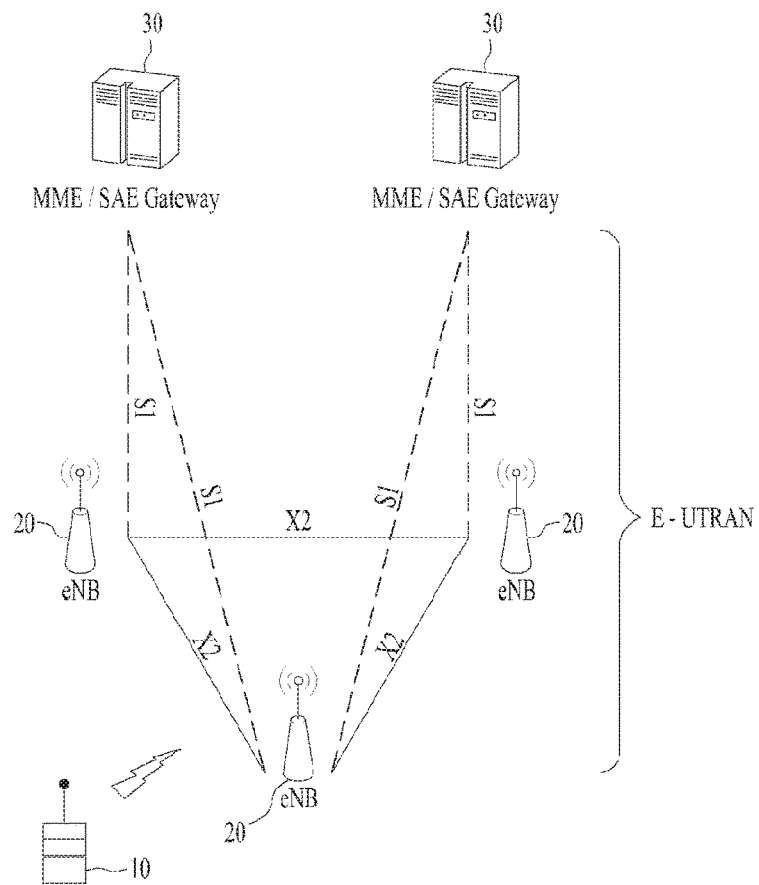

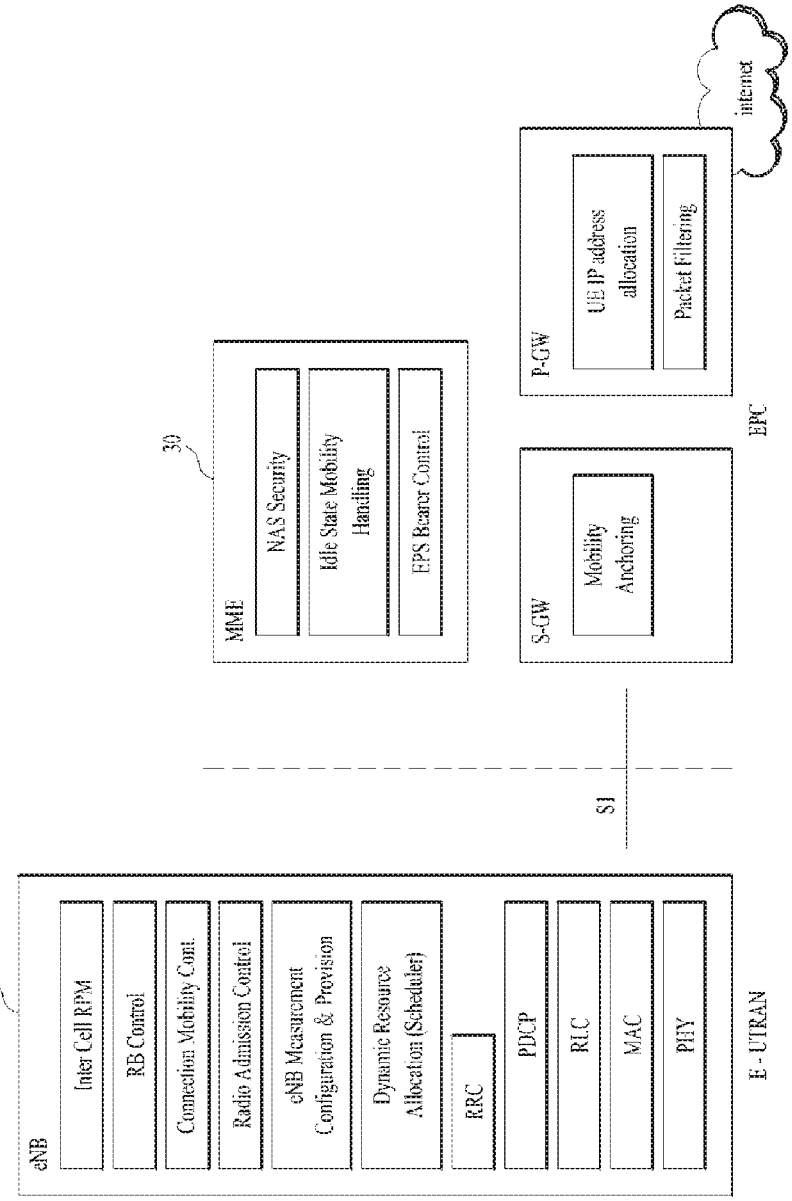
[Fig. 2B]

[Fig. 3]
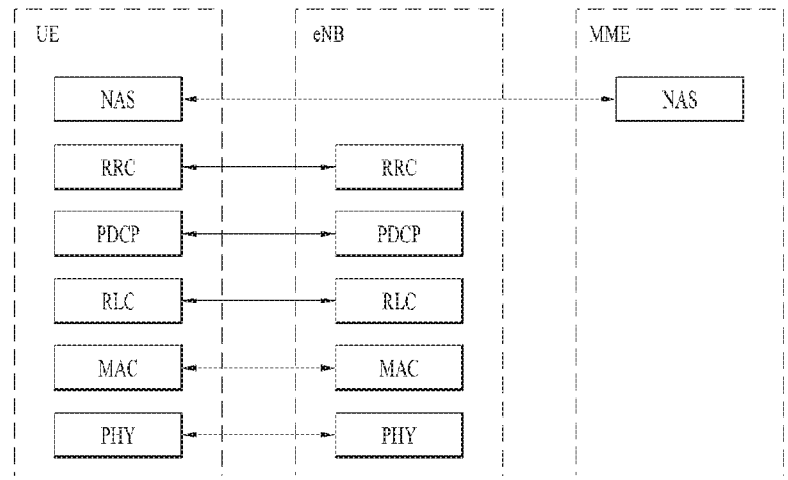
(a) Control-Plane Protocol Stack
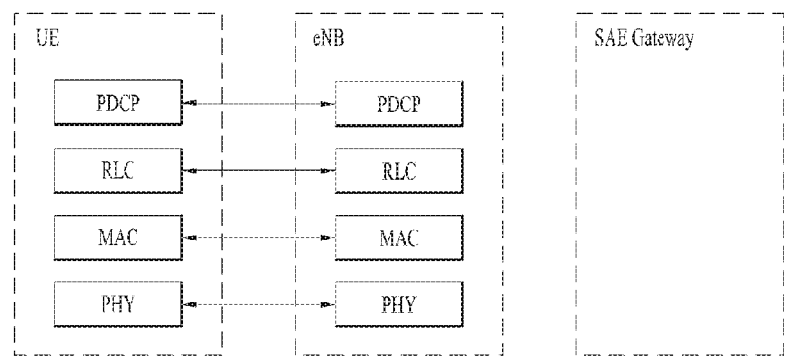
(b) User-Plane Protocol Stack
[Fig. 4]
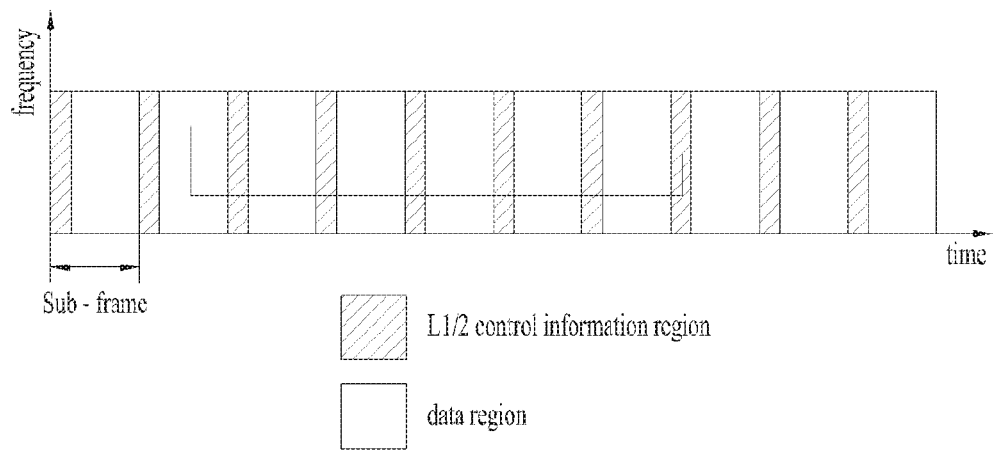

[Fig. 5]
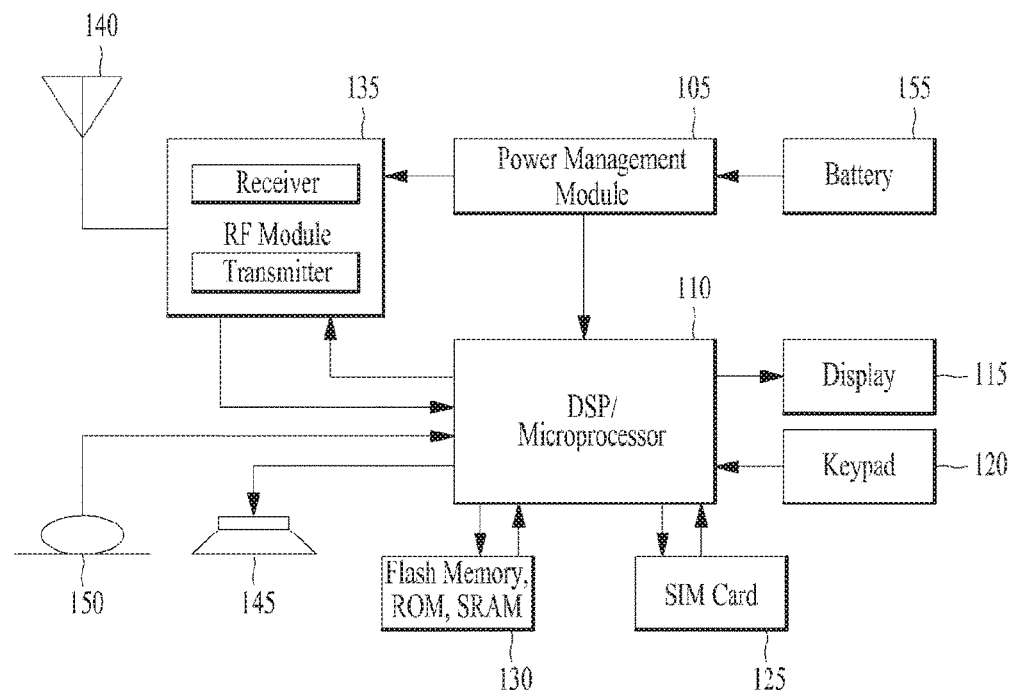
[Fig. 6]
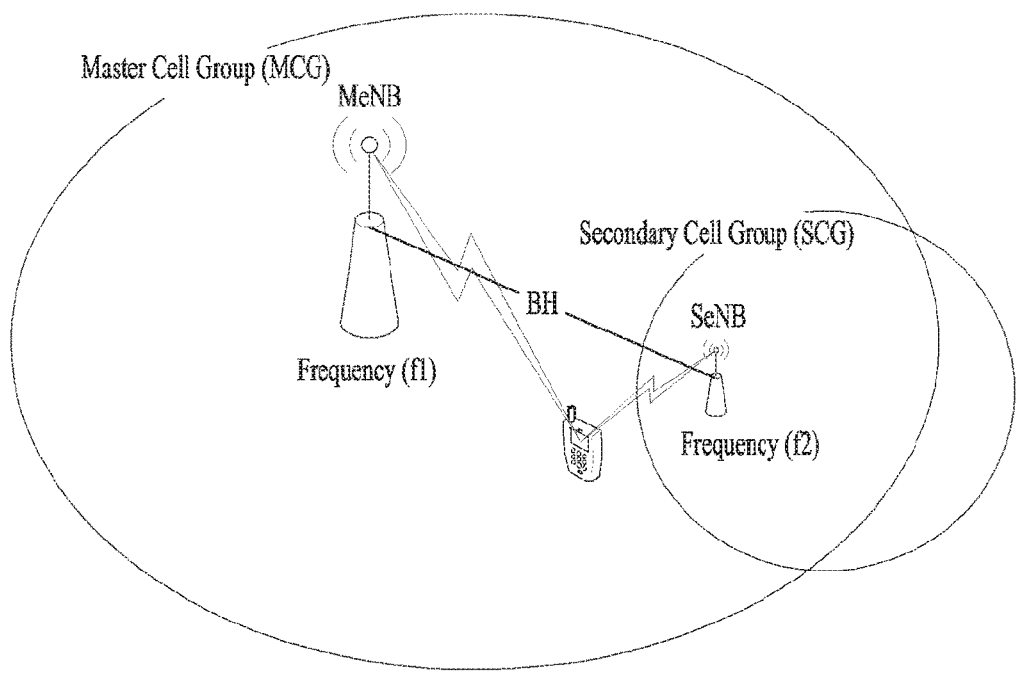

[Fig. 7]
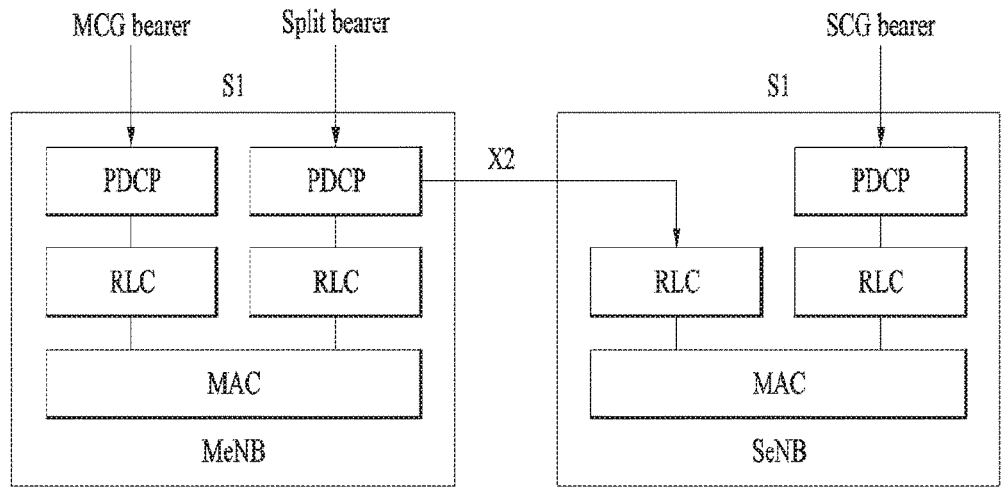
[Fig. 8]
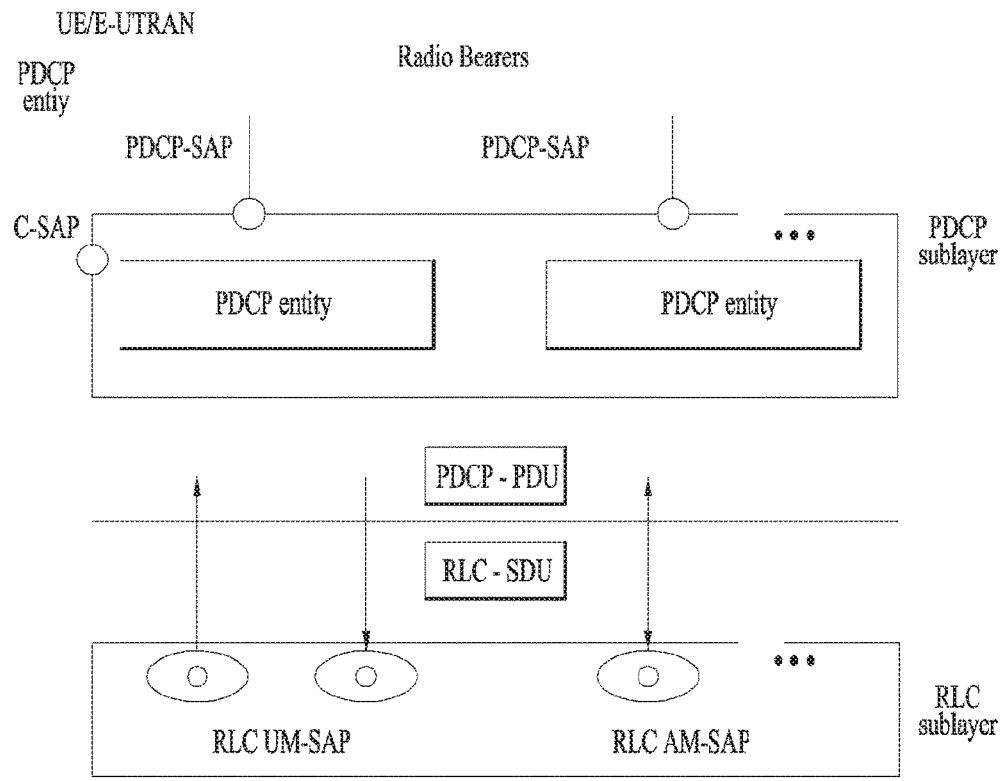

[Fig. 9]
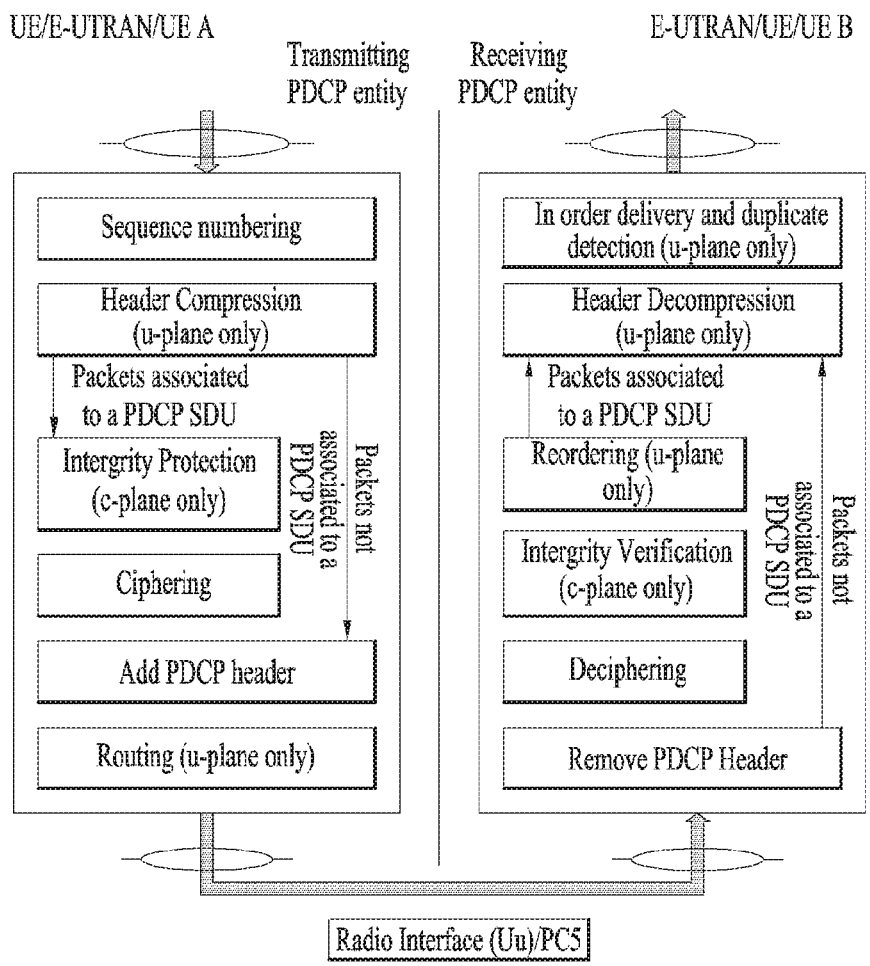

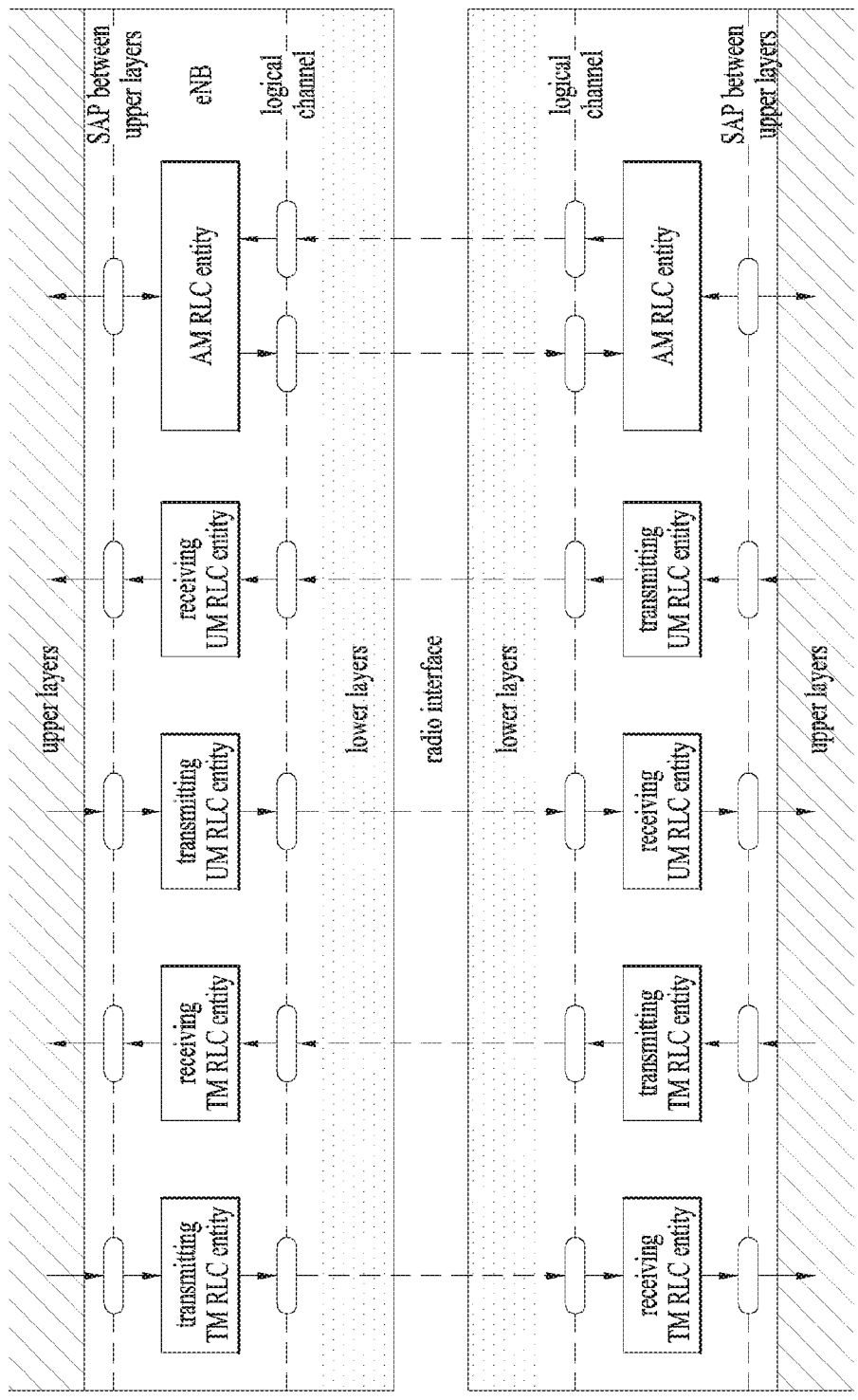
[Fig. 10]

[Fig. 11]
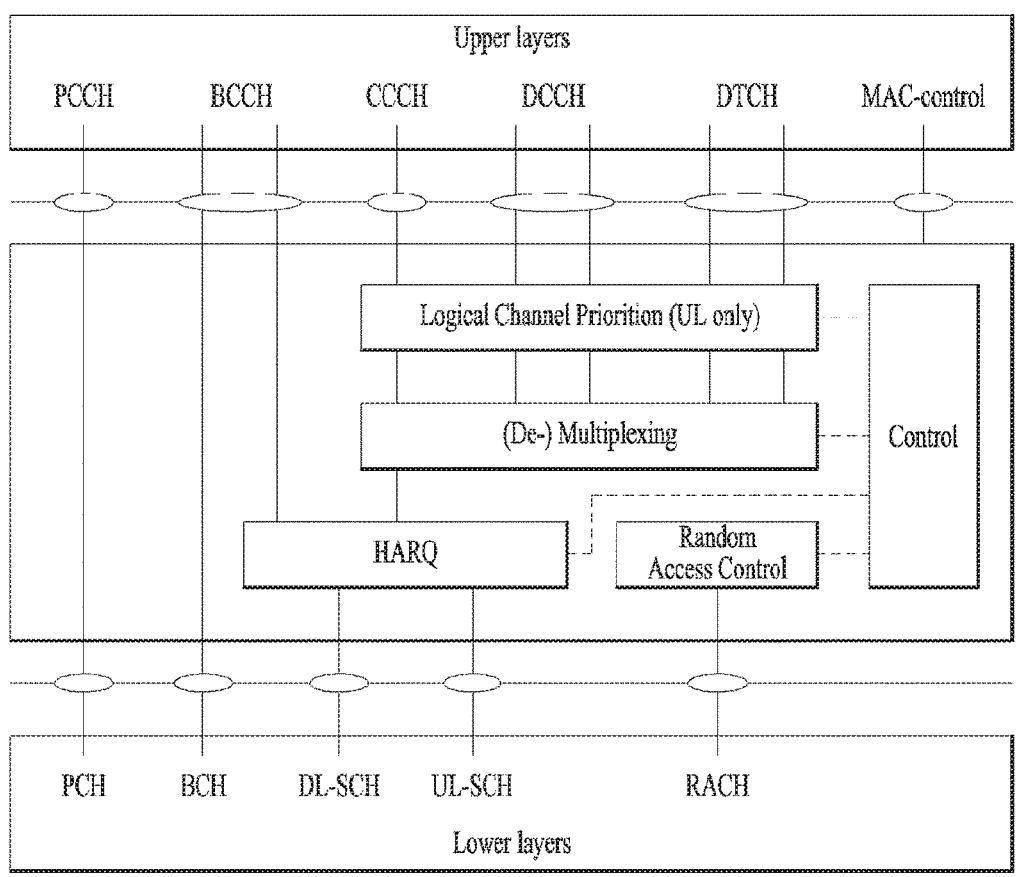

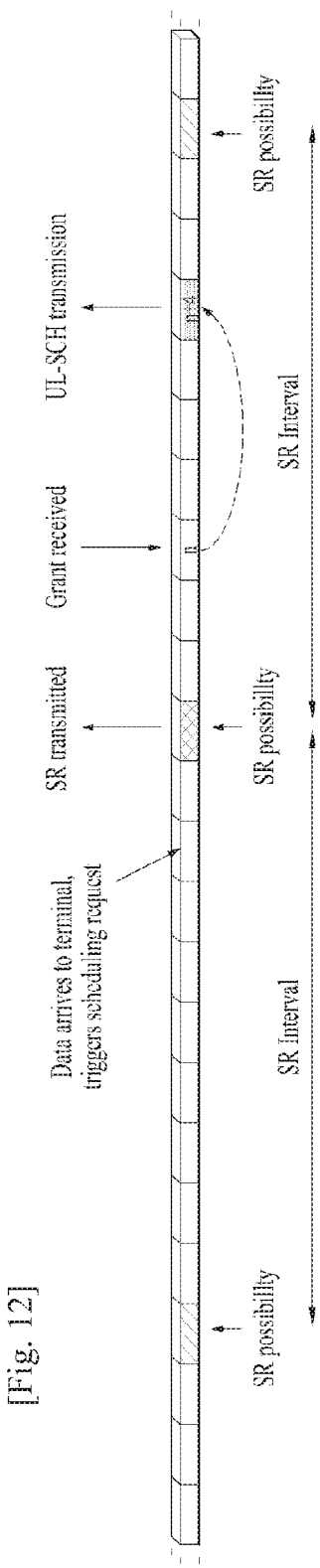
[Fig. 12]

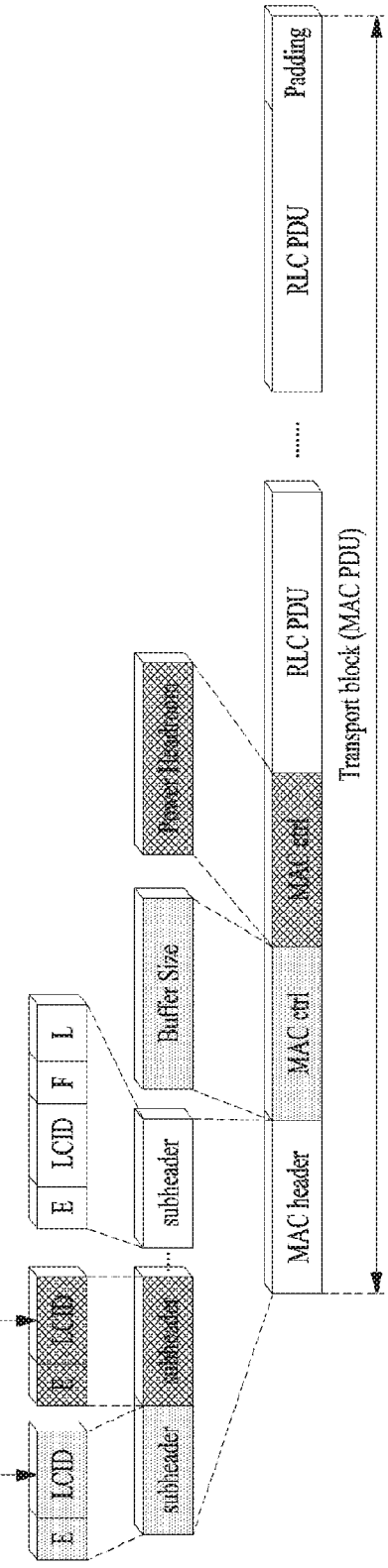

[Fig. 14]
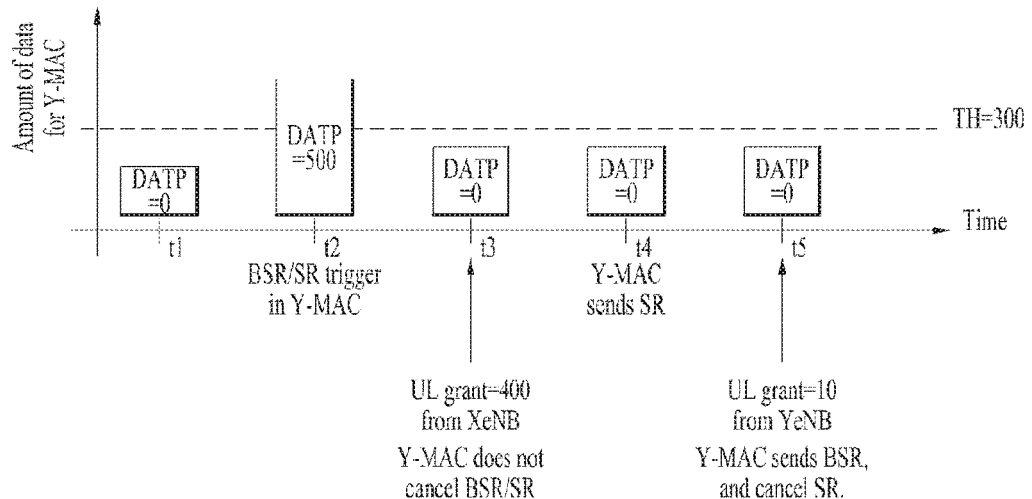
[Fig. 15]
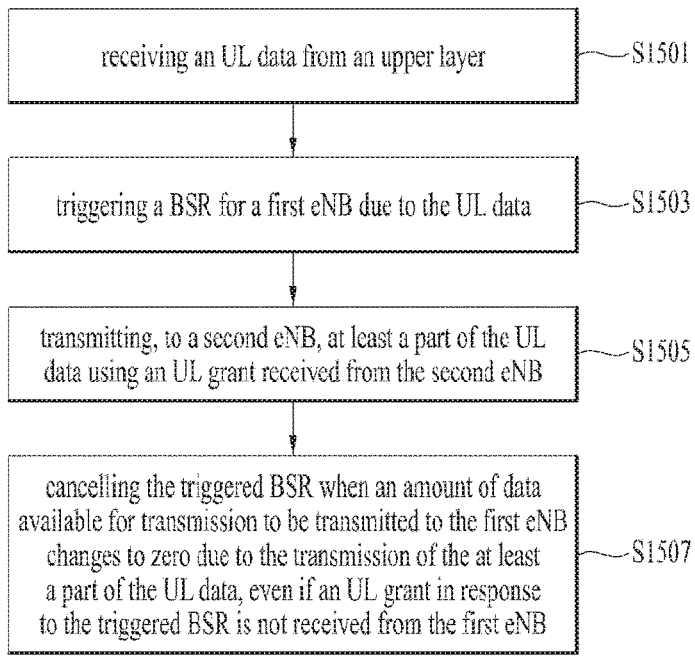

[Fig. 16]
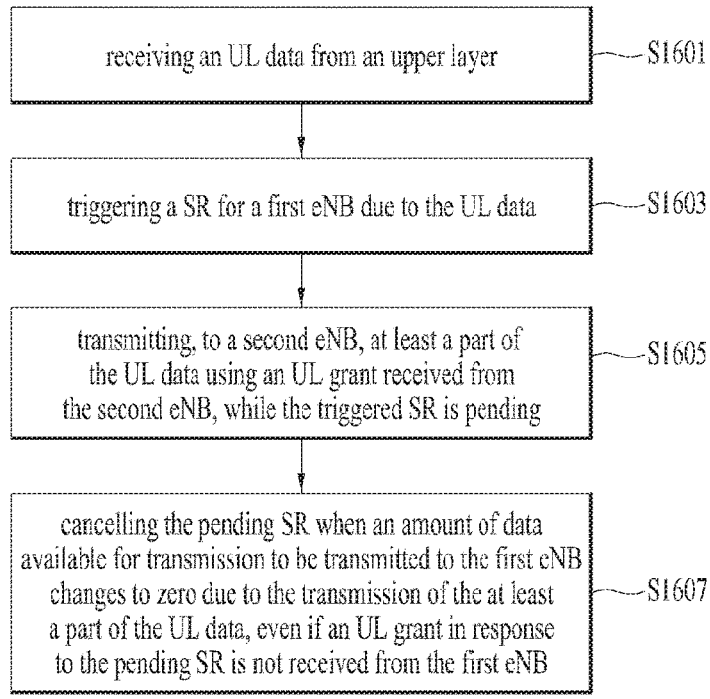
[Fig. 17]
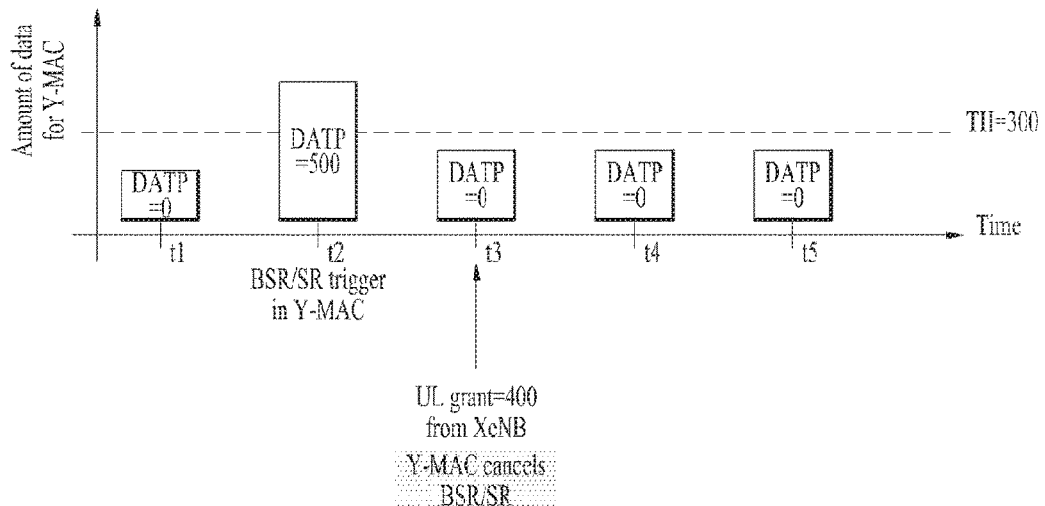

METHOD FOR CANCELLING A BUFFER STATUS REPORT OR A SCHEDULING REQUEST IN DUAL CONNECTIVITY AND A DEVICE THEREFOR

CROSS-REFERENCE TO RELATED APPLICATIONS

This application is the National Stage filing under 35 U.S.C. 371 of International Application No. PCT/KR2016/006605, filed on Jun. 22, 2016, which claims the benefit of U.S. Provisional Application No. 62/189,163, filed on Jul. 6, 2015, the contents of which are all hereby incorporated by reference herein in their entirety.

TECHNICAL FIELD

The present invention relates to a wireless communication system and, more particularly, to a method for cancelling a buffer status report (BSR) or a scheduling request (SR) in dual connectivity and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for cancelling a BSR or a SR in dual connectivity. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

To avoid performing an unnecessary buffer status report (BSR)/scheduling request (SR)/random access (RA) procedure in dual connectivity, it is invented that when total amount of all pending data in a RLC entity and in a PDCP entity for a MAC entity becomes zero, the MAC entity shall cancel all triggered BSRs even if the MAC entity does not receive an UL grant from an eNB.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a conceptual diagram for Dual Connectivity (DC) between a Master Cell Group (MCS) and a Secondary Cell Group (SCG);

FIG. 7 is a conceptual diagram for radio protocol architecture for dual connectivity;

FIG. 8 is a conceptual diagram for a PDCP entity architecture;

FIG. 9 is a conceptual diagram for functional view of a PDCP entity;

FIG. 10 is a conceptual diagram for overview model of the RLC sub layer;

FIG. 11 is a diagram for MAC structure overview in a UE side;

FIG. 12 is a diagram for transmitting a scheduling request.

FIG. 13 is a diagram for signaling of buffer status;

FIG. 14 shows an exemplary problem regarding the current BSR cancellation condition in dual connectivity.

FIG. 15 is conceptual diagram for a UE operation regarding BSR cancellation in dual connectivity according to an exemplary embodiment of the present invention.

FIG. 16 is conceptual diagram for a UE operation regarding SR cancellation in dual connectivity according to an exemplary embodiment of the present invention.

FIG. 17 shows an example of a UE operation according to an exemplary embodiment of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a conceptual diagram for Dual Connectivity (DC) between a Master Cell Group (MCG) and a Secondary Cell Group (SCG).

The Dual Connectivity (DC) means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With Dual Connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

For SCG, the following principles are applied: i) at least one cell in SCG has a configured UL CC and one of them, named PSCell, is configured with PUCCH resources; ii) RRC connection Re-establishment procedure is not triggered; iii) for split bearers, the DL data transfer over the MeNB is maintained; iv) PSCell cannot be deactivated; and v) PSCell can only be changed with SCG change (i.e. with security key change and RACH procedure).

With respect to the interaction between MeNB and SeNB, the following principles are applied: i) the MeNB maintains the RRM measurement configuration of the UE and may, e.g, based on received measurement reports or traffic conditions or bearer types, decide to ask a SeNB to provide additional resources (serving cells) for a UE; ii) upon receiving the request from the MeNB, a SeNB may create the container that will result in the configuration of additional serving cells for the UE (or decide that it has no resource available to do so); iii) for UE capability coordination, the MeNB provides (part of) the AS configuration and the UE capabilities to the SeNB; iv) the MeNB and the SeNB exchange information about UE configuration by means of RRC containers (inter-node messages) carried in X2 messages; v) the SeNB may initiate a reconfiguration of its existing serving cells (e.g., PUCCH towards the SeNB); vi) the SeNB decides which cell is the PSCell within the SCG; and vii) the MeNB does not change the content of the RRC configuration provided by the SeNB.

FIG. 7 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer, split bearer and SCG bearer. Those three alternatives are depicted on FIG. 7. The SRBs (Signaling Radio Bearers) are always of the MCG bearer and therefore only use the radio resources provided by the MeNB. The MCG bearer is a radio protocol only located in the MeNB to use MeNB resources only in the dual connectivity. And the SCG bearer is a radio protocol only located in the SeNB to use SeNB resources in the dual connectivity.

Specially, the split bearer is a radio protocol located in both the MeNB and the SeNB to use both MeNB and SeNB resources in the dual connectivity and the split bearer may be a radio bearer comprising one Packet Data Convergence Protocol (PDCP) entity, two Radio Link Control (RLC) entities and two Medium Access Control (MAC) entities for one direction.

The expected benefits of the split bearer are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

Meanwhile, in LTE-WLAN radio level integration, the radio protocol architecture that a particular bearer uses depends on the LTE-WLAN Aggregation (LWA) backhaul scenario and how the bearer is set up. For the LTE-WLAN radio level integration, similar architecture as dual connectivity can be used. The only change is to replace SeNB by WLAN. Thus, all functions depending on the split bearer can be applied on all technical areas to be used the split bearer. For example, if a structure of the split bearer is applied in a new RAT to be used in 5G network, the all functions depending on the split bearer can be applied on the new RAT.

FIG. 8 is a conceptual diagram for a PDCP entity architecture.

FIG. 8 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bidirectional) and RLC mode. The PDCP entities are located in the PDCP sublayer. The PDCP sublayer is configured by upper layers.

FIG. 9 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 9 represents the functional view of the PDCP entity for the PDCP sublayer; it should not restrict implementation. The figure is based on the radio interface protocol architecture.

For the purpose of MAC buffer status reporting, the UE may consider PDCP Control PDUs, as well as the following as data available for transmission (DAT) in the PDCP layer, for SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE may also consider the following as data available for transmission in the PDCP layer, for SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

For split bearers, when indicating the data available for transmission to the MAC entity for a BSR triggering and Buffer Size calculation, the UE shall indicate the data available for transmission to the MAC entity configured for SCG only if ul-DataSplitDRB-ViaSCG is set to TRUE by upper layer. And if else, the UE shall indicate the data available for transmission to the MAC entity configured for MCG only.

When submitting PDCP PDUs to lower layers, the transmitting PDCP entity shall submit the PDCP PDUs to the associated AM RLC entity configured for SCG if ul-DataSplitDRB-ViaSCG is set to TRUE by upper layers. And if else, the transmitting PDCP entity shall submit the PDCP PDUs to the associated AM RLC entity configured for MCG.

Here, the ul-DataSplitDRB-ViaSCG indicates that whether the UE shall send PDCP PDUs via SCG as specified in TS 36.323. E-UTRAN only configures the field (i.e. indicates value TRUE) for split DRBs.

FIG. 10 is a conceptual diagram for overview model of the RLC sub layer.

Functions of the RLC sub layer are performed by RLC entities. For a RLC entity configured at the eNB, there is a peer RLC entity configured at the UE and vice versa. For an RLC entity configured at the transmitting UE for sidelink traffic channel (STCH) or sidelink broadcast control channel (SBCCH) there is a peer RLC entity configured at each receiving UE for STCH or SBCCH.

An RLC entity receives/delivers RLC SDUs from/to upper layer and sends/receives RLC PDUs to/from its peer RLC entity via lower layers. An RLC PDU can either be a RLC data PDU or a RLC control PDU. If an RLC entity receives RLC SDUs from upper layer, it receives them through a single service access point (SAP) between RLC and upper layer, and after forming RLC data PDUs from the received RLC SDUs, the RLC entity delivers the RLC data PDUs to lower layer through a single logical channel. If an RLC entity receives RLC data PDUs from lower layer, it receives them through a single logical channel, and after forming RLC SDUs from the received RLC data PDUs, the RLC entity delivers the RLC SDUs to upper layer through a single SAP between RLC and upper layer. If an RLC entity delivers/receives RLC control PDUs to/from lower layer, it delivers/receives them through the same logical channel it delivers/receives the RLC data PDUs through.

An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

For the purpose of MAC buffer status reporting, the UE shall consider the following as data available for transmission in the RLC layer: i) RLC SDUs, or segments thereof, that have not yet been included in an RLC data PDU, and ii) RLC data PDUs, or portions thereof, that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as data available for transmission in the RLC layer.

Here, the t-StatusProhibit is a timer for status reporting in TS 36.322, in milliseconds. Regarding a value of the timer, value "ms0" means 0 ms, value "ms5" means 5 ms, and so on.

FIG. 11 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

In Dual Connectivity, two MAC entities are configured in the UE: one for the MCG and one for the SCG. Each MAC entity is configured by RRC with a serving cell supporting PUCCH transmission and contention based Random Access.

The functions of the different MAC entities in the UE operate independently in principle. The timers and parameters used in each MAC entity are configured independently in principle. The Serving Cells, C-RNTI, radio bearers, logical channels, upper and lower layer entities, LCGs, and HARQ entities considered by each MAC entity refer to those mapped to that MAC entity in principle. Exceptively, if otherwise indicated, the different MAC entities can be performed dependently.

FIG. 12 is a diagram for transmitting a scheduling request.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request (SR).

A SR is a simple flag, raised by the terminal to request uplink resources from the uplink scheduler. Since the terminal requesting resources has no PUSCH resource, the SR is transmitted on the PUCCH. Each terminal can be assigned a dedicated PUCCH scheduling request resource, occurring every n-th subframe, as shown in FIG. 12.

When data with higher priority than already existing in the transmit buffers arrives at the terminal and the terminal has no grant and hence cannot transmit the data, the terminal transmits a SR at the next possible instant, as shown in FIG. 12. Upon reception of the request, the scheduler can assign a grant to the terminal. If the terminal does not receive a scheduling grant until the next possible scheduling-request instant, then the SR is repeated.

The use of a single bit for the SR is motivated by the desire to keep the uplink overhead small, as a multi-bit SR would come at a higher cost. A consequence of the single bit SR is the limited knowledge at the eNB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed with reference to FIG. 13.

Although the scheduling-request design for LTE relies on dedicated resources, a terminal that has not been allocated such resources obviously cannot transmit a SR. Instead, terminals without scheduling-request resources configured rely on the random-access mechanism.

When a SR is triggered, it shall be considered as pending until it is cancelled. All pending SRs shall be cancelled and sr-ProhibitTimer shall be stopped, when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the MAC entity shall set the SR_COUNTER to 0.

As long as one SR is pending, for each TTI, the MAC entity shall initiate a Random Access procedure on the SpCell and cancel all pending SRs if no UL-SCH resources are available for a transmission in this TTI, or if the MAC entity has no valid PUCCH resource for SR configured in any TTI.

Else if the MAC entity has a valid PUCCH resource for SR configured for this TTI and if this TTI is not part of a measurement gap and if sr-ProhibitTimer is not running, the MAC entity may increment SR_COUNTER by 1, may instruct the physical layer to signal the SR on PUCCH, and may start the sr-ProhibitTimer, if SR_COUNTER<dsr-TransMax. Else, the MAC entity may notify RRC to release PUCCH/SRS for all serving cells, and may clear any configured downlink assignments and uplink grants, and may initiate a Random Access procedure on the SpCell and cancel all pending SRs.

Meanwhile, terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The MAC control element will be shown in FIG. 13.

FIG. 13 is a diagram for signaling of buffer status.

The LCID field in one of the MAC subheaders is set to a reserved value indicating the presence of a buffer status report, as illustrated in FIG. 13.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of DAT in the UL buffers of the UE. RRC may control BSR reporting by configuring the three timers periodicBSR-Timer and retxBSR-Timer and logicalChannelSR-Prohibit-Timer and by, for each logical channel, optionally signaling Logical Channel Group (LCG) which allocates the logical channel to an LCG.

For the BSR procedure, the MAC entity shall consider all radio bearers which are not suspended and may consider radio bearers which are suspended.

A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision. The UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR".

ii) Change of serving cell, in which case a buffer-status report is useful to provide the new serving cell with information about the situation in the terminal.

iii) Periodically as controlled by a timer. A retxBSR-Timer expires and the UE has data available for transmission for any of the logical channels which belong to a LCG, in which case the BSR is referred below to as "Regular BSR", or a periodicBSR-Timer expires, in which case the BSR is referred below to as "Periodic BSR".

iv) Instead of padding. UL resources are allocated and number of padding bits is equal to or larger than the size of the Buffer Status Report MAC control element plus its subheader, in which case the BSR is referred below to as "Padding BSR". If the amount of padding required to match the scheduled transport block size is larger than a buffer-status report, a buffer-status report is inserted. Clearly it is better to exploit the available payload for useful scheduling information instead of padding if possible.

For Regular BSR, if the BSR is triggered due to data becoming available for transmission for a logical channel for which logicalChannelSR-ProhibitTimer is configured by upper layers, the MAC entity starts the logicalChannelSR-ProhibitTimer if not running. If running, the MAC entity stops the logicalChannelSR-ProhibitTimer.

For Regular and Periodic BSR, if more than one LCG has data available for transmission in the TTI where the BSR is transmitted, the UE may report Long BSR. If else, the UE may report Short BSR.

For Padding BSR, if the number of padding bits is equal to or larger than the size of the Short BSR plus its subheader but smaller than the size of the Long BSR plus its subheader, the UE may report Truncated BSR of LCG with the highest priority logical channel with data available for transmission if more than one LCG has data available for transmission in the TTI where the BSR is transmitted. If else, the UE may report Short BSR.

And else if the number of padding bits is equal to or larger than the size of the Long BSR plus its subheader, the UE may report Long BSR.

If the Buffer Status reporting procedure determines that at least one BSR has been triggered and not cancelled, the UE may instruct the Multiplexing and Assembly procedure to generate the BSR MAC control element(s), start or restart periodicBSR-Timer except when all the generated BSRs are Truncated BSRs, and start or restart retxBSR-Timer if the UE has UL resources allocated for new transmission for this TTI. Else if a Regular BSR has been triggered and logicalChannelSR-ProhibitTimer is not running, a Scheduling Request shall be triggered if an uplink grant is not configured or the Regular BSR was not triggered due to data becoming available for transmission for a logical channel for which logical channel SR masking (logicalChannelSR-Mask) is setup by upper layers.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

A Padding BSR is not allowed to cancel a triggered Regular/Periodic BSR. A Padding BSR is triggered for a specific MAC PDU only and the trigger is cancelled when this MAC PDU has been built.

As discussed above, in order to request an UL grant having a proper amount of UL resources, a UE can transmit a BSR and/or a SR to at least one eNB. For triggering the BSR and/or a SR, a PDCP entity can indicate an amount of data available for transmission in PDCP entity (DATP) to at least one MAC entity. When the UE receives the UL grant, the UE can transmit UL data using the UL grant.

For UL split bearers in Rel-12, the UE indicates the DATP to only one MAC entity depending on the configuration (ul-DataSplitDRB-ViaSCG). For the other MAC entity, the UE does not indicate DATP at all.

In Rel-13, indication behavior of the PDCP entity is changed due to the introduction of threshold, as shown below.

If the PDCP data amount is larger than or equal to the threshold, both MAC entities trigger BSRs and if the PDCP data amount is less than the threshold, only one MAC entity triggers BSR. If ul-DataSplitDRB-ViaSCG is set to TRUE by upper layer, the PDCP entity indicates DATP to the MAC entity configured for SCG only. And else, the PDCP entity indicates DATP to the MAC entity configured for MCG only.

There are some agreements for UE operation regarding UL data transmission in dual connectivity, according to the mentioned above: (1) a PDCP entity is indicated by ul-DataSplitDRB-ViaSCG-r12 to which eNB among a MeNB and a SeNB UE shall trigger a BSR when an amount of DATP is less than a threshold; (2) the PDCP entity reports buffer status for an UL bearer split only towards the eNB indicated by ul-DataSplitDRB-ViaSCG-r12 when the amount of the DATP is less than the threshold; (2a) PDCP entity reports buffer status for an UL bearer split towards the both of the MeNB and the SeNB when the amount of the DATP is above the threshold; (3) PDCP entity transmits PDCP PDU for an UL bearer split only towards the eNB indicated by ul-DataSplitDRB-ViaSCG-r12 when the amount of the DATP is less than the threshold; (4) BSR triggering, Buffer Size calculation, and data transmission is aligned; and (0) the threshold is configured per radio bearer.

Followings are examples of UE operation according to the agreements as discussed above.

In a first case, if PDCP SDU (whose size is X, where X<threshold (Th)) arrives when PDCP buffer is empty, PDCP entity indicates X to MAC entity for SeNB (S-MAC), and S-MAC triggers a BSR. In this case, X is reported to S-MAC for buffer status (BS) calculation in the S-MAC, and 0 is reported to MAC entity for MeNB (M-MAC) for buffer status calculation in M-MAC.

In a second case, if PDCP SDU (whose size is X, where X>Th) arrives when PDCP buffer is empty, PDCP indicates X to both M-MAC and S-MAC, and M-MAC and S-MAC triggers a BSR. In this case, X is reported to S-MAC for BS calculation in S-MAC, and X is reported to M-MAC for BS calculation in M-MAC.

In a third case, if PDCP SDU (whose size is X) arrives when a size of data in PDCP buffer is Y (where Y<Th and X+Y<Th), there is no BSR triggering.

In a fourth case, if PDCP SDU (whose size is X) arrives when data amount in PDCP buffer is Y (where Y<Th and X+Y>Th), PDCP entity indicates X+Y to M-MAC, and M-MAC triggers a BSR.

In a fifth case, if PDCP SDU (whose size is X) arrives when data amount in PDCP buffer is Y (where Y>Th and X+Y>Th), there is no BSR triggering.

In a sixth case, when data amount in PDCP buffer changes from Y to X (where Y>Th and X<Th), there is no BSR triggering.

According to the mentioned agreements, if the amount of DATP is below the threshold, a PDCP entity indicates the amount of DATP to one of MAC entities (e.g., a MAC entity configured for an eNB indicated by ul-DataSplitDRB-ViaSCG-r12. hereinafter, a X-MAC entity), for the purpose of BSR. This would imply that the amount of DATP will be indicated as zero to other MAC entity (e.g., a MAC entity configured for an eNB not indicated by ul-DataSplitDRB-ViaSCG-r12. hereinafter, a Y-MAC entity). If the amount of DATP is above the threshold, the PDCP will indicate the amount of DATP to both MAC entities (i.e, the X-MAC entity and the Y-MAC entity).

As a result, when the amount of DATP becomes above the threshold, the Y-MAC entity will trigger a BSR because, from the Y-MAC entity's point of view, UL data becomes available for transmission in the PDCP entity for which there was no data available for transmission. Meanwhile, apart from this case, it is noted that the Y-MAC entity may trigger a BSR by timers configured for a BSR operation in Y-MAC entity.

After triggering a BSR in the Y-MAC entity by DATP of which the amount is above the threshold, there could be a case that the UE receives an UL grant from an eNB associated with the X-MAC entity (hereinafter, XeNB). If the UL grant can accommodate all of the DATP, in case there is no data available for transmission in a RLC entity associated with the Y-MAC entity, it becomes there is no pending data from the Y-MAC entity's point of view.

In summary, for a split bearer, the amount of pending data for the Y-MAC entity can become zero even without receiving any UL grant from an eNB associated with the Y-MAC entity (hereinafter, YeNB).

Meanwhile, according to the current BSR cancellation condition, all triggered BSR shall be cancelled in case UL grants in this subframe can accommodate all pending data available for transmission but is not sufficient to additionally accommodate the BSR MAC control element plus its subheader, or in case a BSR is included in a MAC PDU for transmission.

The BSR cancellation based on the above conditions has worked well up to Rel-12 because the amount of pending data never becomes zero without receiving any UL grant from the corresponding eNB. However, since a split bearer is introduced in Rel-13, it is possible that the amount of pending data becomes zero from the Y-MAC entity's perspective even without receiving any UL grant from the YeNB because an UL grant can be received from the XeNB. A specific example regarding this issue will be discussed with reference to FIG. 14.

FIG. 14 shows an exemplary problem regarding the current BSR cancellation condition in dual connectivity.

In FIG. 14, it is assumed that there is no data available for transmission in a Y-RLC entity (i.e, a RLC entity associated with the Y-MAC entity).

Referring to FIG. 14, the UE is configured by the network that, if the amount of data available transmission in a PDCP entity associated with the Y-MAC entity is less than threshold (300 bytes), the Y-MAC entity considers that there is no DATP (i.e., DATP=0). The threshold is configured by the network.

At t1, there is no DATP for the Y-MAC entity's point of view.

At t2, the amount of DATP becomes 500 bytes. Thus, the amount of DATP becomes larger than the threshold (300 bytes). Hence, the Y-MAC entity triggers a BSR and/or a scheduling request (SR). Here, a PDCP entity associated with the Y-MAC entity may indicates the amount of DATP to the Y-MAC entity, because the amount of DATP (500 bytes) is larger than the threshold (300 bytes).

At t3, the UE receives an UL grant (400 bytes) from an eNB associated with the X-MAC entity (hereinafter, XeNB), and the X-MAC entity transmits 400 bytes of MAC PDU to the XeNB. Accordingly, total amount of data in the PDCP entity becomes 100 bytes, which is less than the threshold (300 bytes). Thus, from the Y-MAC entity's point of view, the amount of DATP becomes zero. However, according to the current BSR cancellation condition, the Y-MAC entity does not cancel any triggered BSR and any pending SR, even the amount of DATP in the Y-MAC entity's perspective becomes zero.

At t4, the Y-MAC entity may transmit a SR to an eNB associated with the Y-MAC entity (i.e, YeNB).

At t5, the UE receives an UL grant (10 bytes) from the YeNB in response to the SR. The Y-MAC entity transmits a BSR using the UL grant (10 bytes) to the YeNB, and the Y-MAC entity cancels the pending SR.

In summary, according to the current BSR cancellation condition, all triggered BSR in the Y-MAC entity will remain triggered until an UL grant is received from the YeNB entity and the Y-MAC entity may initiate SR and/or random access (RA) procedure although there is no pending data at all from the Y-MAC entity's point of view.

Therefore, a new mechanism is needed to cancel a BSR/a SR properly in the Y-MAC entity by considering the fluctuation of the amount of DATP from the Y-MAC entity's point of view. A UE operation for cancelling a BSR/a SR properly in dual connectivity will be discussed with reference to FIGS. 15 and 16.

FIG. 15 is conceptual diagram for a UE operation regarding a BSR cancellation in dual connectivity according to an exemplary embodiment of the present invention.

It is invented that, for a split bearer in dual connectivity, when total amount of all pending data in a RLC entity and in a PDCP entity for a Y-MAC entity becomes zero, the Y-MAC entity shall cancel all triggered BSRs even if the Y-MAC entity does not receive an UL grant from a YeNB, upon when the amount of all pending data becomes zero for the Y-MAC.

For the invention, it is assumed that there are two MAC entities, two RLC entities, and one PDCP entity for a split bearer. Two MAC entities are a X-MAC entity and a Y-MAC entity. As described above, the X-MAC entity may be a MAC entity configured for an eNB indicated by ul-DataSplitDRB-ViaSCG-r12, and the Y-MAC entity may be a MAC entity configured for an eNB not indicated by ul-DataSplitDRB-ViaSCG-r12. Two RLC entities are a X-RLC entity associated with the X-MAC entity and a Y-RLC entity associated with the Y-MAC entity. It is also assumed that if an amount of DATP is less than a threshold, the X-MAC entity considers that there is data available for transmission in PDCP entity, but the Y-MAC entity considers that there is no data available for transmission in PDCP entity.

The X- may be associated with either MCG or SCG and Y- may be associated with either SCG or MCG, respectively, which is configured by the network.

It is also assumed that all pending data in a RLC entity or in a PDCP entity is the data available for transmission in the RLC entity or in the PDCP entity as specified with reference to FIGS. 9 and 10, respectively. The Y-MAC entity triggers a BSR based on the BSR trigger condition as specified with reference to FIG. 13.

If the Y-MAC entity has triggered at least one BSR and has not cancelled the at least one BSR, when the total amount of the data available for transmission in a PDCP entity associated with the Y-MAC entity and in a Y-RLC entity associated with the Y-MAC entity is zero, the Y-MAC entity considers that there is no data available for transmission in the PDCP entity and there is no data available for transmission in the Y-RLC entity.

Referring to FIG. 15, a UE receives an UL data from an upper layer (S1501). The UL data may be received at a PDCP entity or at a RLC entity.

After that, the Y-MAC entity of the UE may trigger a BSR for a first eNB due to the UL data (S1503). The first eNB may be an eNB associated with the Y-MAC entity (i.e, YeNB). In the present exemplary embodiment, the amount of the data available for transmission is above the threshold, thus the amount of data available for transmission may be indicated to both of the X-MAC entity and the Y-MAC entity.

After the BSR is triggered, the UE transmits, to a second eNB, at least a part of the UL data using an UL grant received from the second eNB (S1505). The second eNB may be an eNB associated with the X-MAC entity (i.e, XeNB).

Due to the transmission of the at least a part of the UL data, thus the amount of data available for transmission to be transmitted to the first eNB (i.e, the amount of data available for transmission in the Y-MAC entity's point of view) changes to zero. Therefore, the Y-MAC entity cancels the triggered BSR, even if an UL grant in response to the triggered BSR is not received from the first eNB (S1507). The data available for transmission to be transmitted to the first eNB is zero, when an amount of data available for transmission in the PDCP entity is less than the threshold and an amount of data available for transmission in a RLC entity configured for the first eNB is zero. In other words, if the Y-MAC entity has triggered at least one BSR and has not cancelled the at least one BSR, and when the Y-MAC entity considers that there is no data available for transmission in both of the PDCP entity and the Y-RLC entity, the Y-MAC entity shall cancel all triggered BSRs.

When the Y-MAC entity cancels the triggered BSR, the Y-MAC entity may also cancel another triggered BSR for the first eNB. However, the Y-MAC entity may not cancel another triggered BSR for the second eNB when the triggered BSR is cancelled. In other words, when the Y-MAC entity cancels all triggered BSRs, the X-MAC entity does not cancel the BSRs which have been triggered by the X-MAC entity.

FIG. 16 is conceptual diagram for a UE operation regarding SR cancellation in dual connectivity according to an exemplary embodiment of the present invention.

It is invented that, for a split bearer in dual connectivity, when total amount of all pending data in a RLC entity and in a PDCP entity for a Y-MAC entity becomes zero, the Y-MAC entity shall cancel all pending SRs even if the Y-MAC entity does not receive an UL grant from a YeNB, upon when the amount of all pending data becomes zero for the Y-MAC.

For the invention, it is assumed that there are two MAC entities, two RLC entities, and one PDCP entity for a split bearer. Two MAC entities are a X-MAC entity and a Y-MAC entity. As described above, the X-MAC entity may be a MAC entity configured for an eNB indicated by ul-DataSplitDRB-ViaSCG-r12, and the Y-MAC entity may be a MAC entity configured for an eNB not indicated by ul-DataSplitDRB-ViaSCG-r12. Two RLC entities are a X-RLC entity associated with the X-MAC entity and a Y-RLC entity associated with the Y-MAC entity. It is also assumed that if an amount of DATP is less than a threshold, the X-MAC entity considers that there is data available for transmission in PDCP entity, but the Y-MAC entity considers that there is no data available for transmission in PDCP entity.

The X- may be associated with either MCG or SCG and Y- may be associated with either SCG or MCG, respectively, which is configured by the network.

It is also assumed that all pending data in a RLC entity or in a PDCP entity is the data available for transmission in the RLC entity or in the PDCP entity as specified with reference to FIGS. 9 and 10, respectively. The Y-MAC entity triggers a SR based on the SR trigger condition as specified with reference to FIG. 12.

If the Y-MAC entity has triggered at least one SR and has not cancelled the at least one SR, when the total amount of the data available for transmission in a PDCP entity associated with the Y-MAC entity and in a Y-RLC entity associated with the Y-MAC entity is zero, the Y-MAC entity considers that there is no data available for transmission in the PDCP entity and there is no data available for transmission in the Y-RLC entity.

Referring to FIG. 16, a UE receives an UL data from an upper layer (S1601). The UL data may be received at a PDCP entity or at a RLC entity.

After that, the Y-MAC entity of the UE may trigger a SR for a first eNB due to the UL data (S1603). The first eNB may be an eNB associated with the Y-MAC entity (i.e, YeNB). In the present exemplary embodiment, the amount of the data available for transmission is above the threshold, thus the amount of data available for transmission may be indicated to both of the X-MAC entity and the Y-MAC entity.

After the SR is triggered, the UE transmits, to a second eNB, at least a part of the UL data using an UL grant received from the second eNB, while the triggered SR is pending (S1605). The second eNB may be an eNB associated with the X-MAC entity (i.e, XeNB).

Due to the transmission of the at least a part of the UL data, thus the amount of data available for transmission to be transmitted to the first eNB (i.e, the amount of data available for transmission in the Y-MAC entity's point of view) changes to zero. Therefore, the Y-MAC entity cancels the pending SR, even if an UL grant in response to the pending SR is not received from the first eNB (S1607). The data available for transmission to be transmitted to the first eNB is zero, when an amount of data available for transmission in the PDCP entity is less than the threshold and an amount of data available for transmission in a RLC entity configured for the first eNB is zero. In other words, if the Y-MAC entity has triggered at least one SR and if the triggered at least one SR is pending, and when the Y-MAC entity considers that there is no data available for transmission in both of the PDCP entity and the Y-RLC entity, the Y-MAC entity shall cancel all pending SRs and stop sr-ProhibitTimer.

When the Y-MAC entity cancels the pending SR, the Y-MAC entity may also cancel another pending SR for the first eNB. However, the Y-MAC entity may not cancel another pending SR for the second eNB when the pending SR is cancelled. In other words, when the Y-MAC entity cancels all pending SRs, the X-MAC entity does not cancel the SRs which have been triggered by the X-MAC entity. More specific example of a UE operation for cancelling a BSR/a SR described above will be discussed with reference to FIG. 17.

FIG. 17 shows an example of a UE operation according to an exemplary embodiment of the present invention.

In FIG. 17, it is assumed that there is no data available for transmission in a Y-RLC entity (i.e, a RLC entity associated with the Y-MAC entity).

Referring to FIG. 17, the UE is configured by the network that, if the amount of data available transmission in a PDCP entity associated with the Y-MAC entity is less than threshold (300 bytes), the Y-MAC entity considers that there is no DATP (i.e., DATP=0). The threshold is configured by the network.

At t1, there is no DATP for the Y-MAC entity's point of view.

At t2, the amount of DATP becomes 500 bytes. Thus, the amount of DATP becomes larger than the threshold (300 bytes). Hence, the Y-MAC entity triggers a BSR and a SR. Here, a PDCP entity associated with the Y-MAC entity may indicates the amount of DATP to the Y-MAC entity, because the amount of DATP (500 bytes) is larger than the threshold (300 bytes).

At t3, the UE receives an UL grant (400 bytes) from an eNB associated with the X-MAC entity (hereinafter, XeNB), and the X-MAC entity transmits 400 bytes of MAC PDU to the XeNB. Accordingly, total amount of data in the PDCP entity becomes 100 bytes, which is less than the threshold (300 bytes). Thus, from the Y-MAC entity's point of view, the amount of DATP becomes zero. Therefore, the Y-MAC entity cancels all triggered BSR and pending SRs.

As discussed above, according to the embodiments of the present invention, a BSR and/or a SR could be cancelled properly in a MAC entity, in order to avoid performing unnecessary BSR/SR/RA procedure in dual connectivity.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   receiving an uplink (UL) data from an upper layer;
   triggering a buffer status reporting (BSR) for a first base station due to the UL data;
   transmitting, to a second base station, at least a part of the UL data using an UL grant received from the second base station; and
   cancelling the triggered BSR when an amount of data available for transmission to be transmitted to the first base station changes to zero due to the transmission of the at least a part of the UL data, even if an UL grant in response to the triggered BSR is not received from the first base station, wherein the amount of the data available for transmission to be transmitted to the first base station is zero, when an amount of data available for transmission in a packet data convergence protocol (PDCP) entity is less than a threshold and an amount of data available for transmission in a radio link control (RLC) entity configured for the first base station is zero.

2. The method according to claim 1, further comprising: cancelling all triggered BSR for the first base station when the triggered BSR is cancelled.

3. The method according to claim 1, wherein a triggered BSR for the second base station is not cancelled when the triggered BSR is cancelled.

4. A method for a user equipment operating in a wireless communication system, the method comprising:

receiving an uplink data from an upper layer;

triggering a scheduling request (SR) for a first base station due to the UL data;

transmitting, to a second base station, at least a part of the UL data using an UL grant received from the second base station while the triggered SR is pending; and cancelling the pending SR when an amount of data available for transmission to be transmitted to the first base station changes to zero due to the transmission of the at least a part of the UL data, even if an UL grant in response to the pending SR is not received from the first base station, wherein the amount of the data available for transmission to be transmitted to the first base station is zero, when an amount of data available for transmission in a packet data convergence protocol (PDCP) entity is less than a threshold and an amount of data available for transmission in a radio link control (RLC) entity configured for the first base station is zero.

5. The method according to claim 4, further comprising: cancelling all pending SR for the first base station when the pending SR is cancelled.

6. The method according to claim 4, wherein a pending SR for the second base station is not cancelled when the pending SR is cancelled.

7. A User Equipment (UE) for operating in a wireless communication system, the UE comprising:

a Radio Frequency (RF) module; and a processor operably coupled with the RF module and configured to:

receive an uplink (UL) data from an upper layer;

trigger a buffer status reporting (BSR) for a first base station due to the UL data;

transmit, to a second base station, at least a part of the UL data using an UL grant received from the second base station; and cancel the triggered BSR when an amount of data available for transmission to be transmitted to the first base station changes to zero due to the transmission of the at least a part of the UL data, even if an UL grant in response to the triggered BSR is not received from the first base station, wherein the amount of the data available for transmission to be transmitted to the first base station is zero, when an amount of data available for transmission in a packet data convergence protocol (PDCP) entity is less than a threshold and an amount of data available for transmission in a radio link control (RLC) entity configured for the first base station is zero.

8. The method according to claim 7, wherein the processor is further configured to:

cancel all triggered BSR for the first base station when the triggered BSR is cancelled.

9. The method according to claim 7, wherein a triggered BSR for the second base station is not cancelled when the triggered BSR is cancelled.

10. A User Equipment (UE) for operating in a wireless communication system, the UE comprising:

a Radio Frequency (RF) module; and a processor operably coupled with the RF module and configured to:

receive an uplink (UL) data from an upper layer;

trigger a scheduling request (SR) for a first base station due to the UL data;

transmit, to a second base station, at least a part of the UL data using an UL grant received from the second base station while the triggered SR is pending; and cancel the pending SR when an amount of data available for transmission to be transmitted to the first base station changes to zero due to the transmission of the at least a part of the UL data, even if an UL grant in response to the pending SR is not received from the first base station, wherein the amount of the data available for transmission to be transmitted to the first base station is zero, when an amount of data available for transmission in a packet data convergence protocol (PDCP) entity is less than a threshold and an amount of data available for transmission in a radio link control (RLC) entity configured for the first base station is zero.

11. The method according to claim 10, wherein the processor is further configured to:

cancel all pending SR for the first base station when the pending SR is cancelled.

12. The method according to claim 10, wherein a pending SR for the second base station is not cancelled when the pending SR is cancelled.

* * * * *